United States Patent [19]

Higgins

[11] Patent Number: 4,811,695

[45] Date of Patent: Mar. 14, 1989

[54] UNIVERSAL ANIMAL COLLAR

[75] Inventor: Ronald E. Higgins, Asheville, N.C.

[73] Assignee: Ron-Li Corporation, Asheville, N.C.

[21] Appl. No.: 63,391

[22] Filed: Jun. 18, 1987

[51] Int. Cl.$^4$ .............................................. R01K 27/00
[52] U.S. Cl. ....................................................... 119/106
[58] Field of Search .................... 119/96, 106, 109; 54/19 R, 18 R, 19 B

[56] References Cited

U.S. PATENT DOCUMENTS

| 188,043 | 3/1877 | Elmore | 119/106 |
|---|---|---|---|
| 424,197 | 4/1890 | Harrison | 119/106 |
| 770,070 | 9/1904 | Johnson | 119/106 |
| 2,453,010 | 4/1946 | Graffin | 119/106 |
| 2,859,732 | 10/1956 | Driscoll | 119/106 |
| 3,687,112 | 8/1972 | Henderson | 119/106 |
| 3,872,833 | 3/1975 | Herbert | 119/106 |
| 4,173,201 | 11/1979 | Chao et al. | 119/106 |
| 4,426,957 | 1/1984 | Horrigan | 119/106 |

*Primary Examiner*—Gene Mancene
*Assistant Examiner*—R. Thomas Price
*Attorney, Agent, or Firm*—David M. Carter

[57] ABSTRACT

There is provided an animal collar which may be used as a training or choke collar as well as an identification collar. A pair of joined laminates form part of the collar. The laminates have rings attached to opposing ends. A ropelike web forms another part of the collar and is attached to one ring. The web is slidably received through the other ring. The collar includes an elongated leaf spring located between the two laminates for enhancing the collar's use as a training collar. The free end of the ropelike web may be selectively attached to one of the laminates so that the collar may also be used as an identification collar.

2 Claims, 1 Drawing Sheet

UNIVERSAL ANIMAL COLLAR

BACKGROUND OF THE INVENTION

This invention relates to animal collars. More particularly it relates to multipurpose animal collars.

Animal collars which are used for training purposes are often referred to as choke collars. Other animal collars of a fixed circumference which are worn for identification purposes are often referred to as identification collars primarily because the name of the animal or the owner's name and address are often written thereon.

Choke collars are simply an elongated piece of rope having a pair of steel rings at the ends. The rope is doubled and pressed through one of the rings, resulting in a loop having a variable circumference, with the major circumference being limited by contact between the rings and the minor circumference being limited by the animal's neck. The collar is placed around the animal's neck and the animal is restrained by pulling the ring which is attached to a movable end of the rope thereby enabling the trainer to more readily restrain the animal.

One of the problems in using a choke collar is that quite often it does not loosen at the proper time because the animal's hair or skin becomes caught in one of the rings. Such a choke collar must be put on the animal's neck so that the ring acts as a weight and allows the collar to release by gravity. The novice trainer or owner may not be aware of this procedure, therefore the collar will not release properly if it is not put on the animal's neck correctly. Furthermore, since it is dangerous to permit an animal to run free with a choke collar on, the owner of the choke collar will also more than likely want an identification collar to be used when the animal is not being trained. Therefore two separate collars are required.

Normally the identification collar is simply a piece of leather resembling a belt having a buckle so that it may fit various sizes of animals.

Various collars are the subject of patent literature and are discussed below.

U.S. Pat. Nos. 4,558,663 issued to Kaplanis, 4,476,814 issued to Miller, 4,022,161 issued to Halperin, and 4,020,795 issued to Marks all show choke collars. However, the collars set forth in the above patents are complicated devices and are difficult to manufacture.

OBJECTS OF THE INVENTION

It is therefore one object of this invention to provide an improved animal collar.

It is another object to provide an animal collar which may be used for both training and identification purposes.

It is another object to provide a training collar which will readily return to its relaxed position when pressure is released by the trainer.

It is still another object to provide a collar which may be used as a training collar and an identification collar for various sizes of animals.

It is another object to provide a collar which may be used as a training collar and which will release properly no matter how it is put on.

SUMMARY OF THE INVENTION

In accordance with one form of this invention, there is provided an animal collar which includes at least one laminate. Preferably a pair of elongated laminates are used rather than only one and are fastened together. The laminates may be separate or may be formed by a single continuous piece of material which is folded back on itself. The laminate or laminates are adapted to be curved to generally conform to the shape of the animal's neck and are adapted to be received around a portion of the animal's neck. A resilient stiffening mechanism contacts at least one of the laminates. A strap, which may be a rope, a belt, or the like, is connected to one end of at least one of the laminates. An eyelet is connected to the other end of the laminate or laminates and the ropelike material passes therethrough. Preferably the strap has a second eyelet attached to its end as a gripping means or attachment means so that the strap may be pulled firm against the animal's neck. The resilient mechanism causes the ropelike material to be retracted back through the first eyelet to relieve pressure on the animal's neck. A mechanism also preferably is provided on the laminate for attachment to the second eyelet so that its circumference may be fixed. Thus the collar may be used both as a training collar and an identification collar. Also preferably the strap is adjustable in length to accommodate various sizes of animals.

BRIEF DESCRIPTION OF THE DRAWINGS

The subject matter which is regarded as the invention is set forth in the appended claims. The invention itself, however, together with further objects and advantages thereof, may be better understood with reference to the following description taken in conjunction with the accompanying drawings in which:

DESCRIPTION OF THE PREFERRED EMBODIMENT

Figure 1:
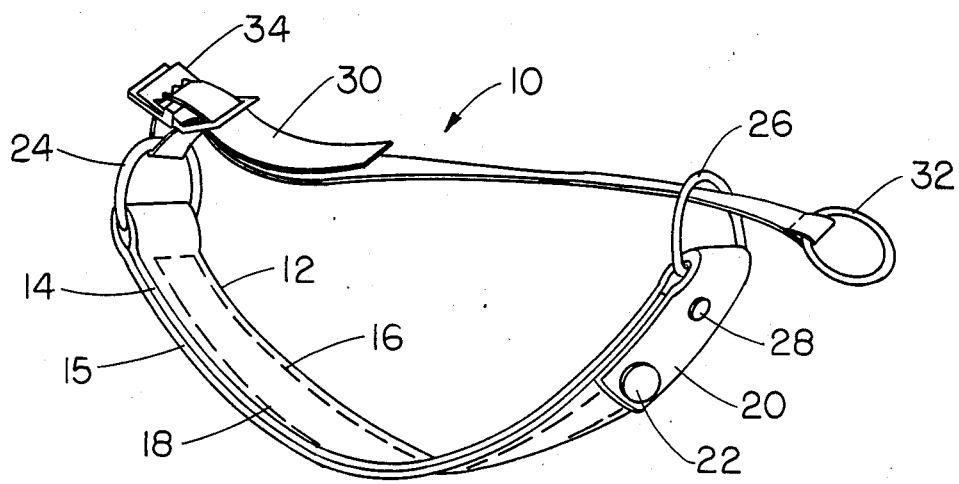
FIG. 1 is a pictorial view of the collar of the subject invention shown in its training collar mode.

Referring now more particularly to FIG. 1, there is provided animal collar 10 which includes elongated laminate 12 which is folded back upon itself forming adjacent laminates 14 and 15 which are sewn together as indicated by rows of stitches 16 and 18. A third laminate 20 is also provided by folding the first laminate 14 back over the second laminate 15. The third laminate 20 includes snap 22 which may be connected to laminate 15 by means of a corresponding snap (not shown). The collar includes first ring 24 which is received at a loop formed by the fold-back intersection of laminates 14 and 15. The collar further includes a second ring 24 which is held to the collar by means of the loop formed by fold-back intersection between the first laminate 14 and the third laminate 20. A permanent pin 28 is received through the first, second and third laminates so that ring 26 will not slip off. A strap 30 is connected to ring 24 at one end. The other end of strap 30 has third ring 32 attached thereto. Strap 30 passes through the eyelet of ring 26. Rope 30 has buckle 34 attached thereto so that the length of the rope and thus the overall circumference of the collar may be made adjustable normally when the collar is removed from the animal.

Figure 3:
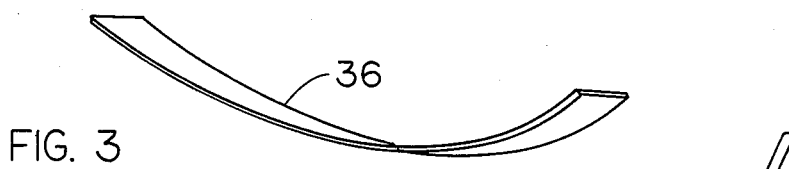
FIG. 3 is a pictorial view showing the leaf spring used in conjunction with the collar of the subject invention.
Figure 4:
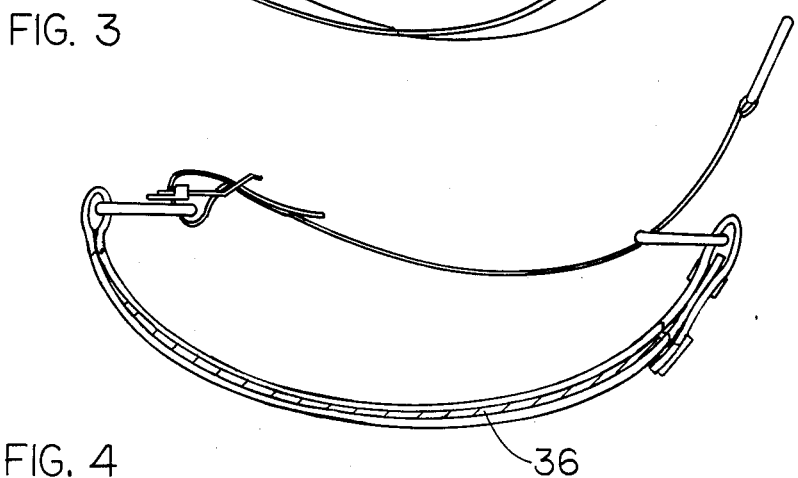
FIG. 4 is a side view of the collar of FIG. 1 with a portion removed and showing the leaf spring in cross-section.

Referring now to FIG. 4, sandwiched between laminates 14 and 15 is leaf spring 36 which is somewhat stiff but also resilient. Leaf spring 26 holds the laminates 14 and 15 in a curved position, however leaf spring 36 is resilient enough to permit the laminates to curve inwardly when ring 32 is pulled, thus pulling more of the rope 30 through ring 26 while the collar is being used as a training collar. However, leaf spring 36 is stiff enough to force the collar back to its original shape when pressure is released from ring 32, thus causing the strap 30 to slide back through ring 26 to its original position. Leaf spring 36 is shown in a pictorial view in FIG. 3. Preferably leaf spring 36 is made of a tempered metal such as steel or of a resilient plastic material.

As shown in FIG. 1, the leaf spring is held in place between laminates 14 and 15 because the laminates are sewn together.

Figure 2:
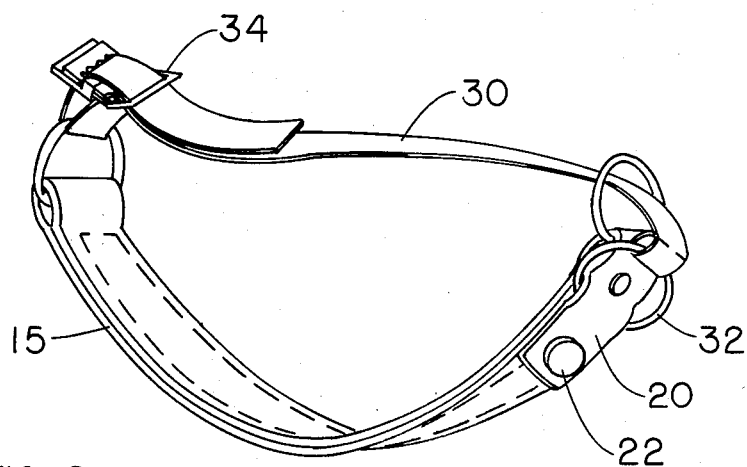
FIG. 2 is a pictorial view of the collar of FIG. 1, however shown in its identification collar mode.

The collar may also be used as a normally fixed circumference identification collar. This may be better seen in reference to FIG. 2. Ring 32 which is attached to the end of strap 30 is placed between laminates 15 and 20. This is accomplished by first opening snap 22 and sliding ring 32 to the position shown in FIG. 2. Snap 22 is then closed, thus the collar may no longer be used as a training collar but may be used as a fixed circumference identification collar. While the circumference is fixed, it may be changed periodically by means of buckle 34, however this change is normally made when the collar is off the animal and is only made when the collar is used for different sizes of animals or as the animal grows.

By referring to item 30 as strap, it is not meant to limit it to normal understanding of strap. Material 30 could be a laminate or web of strap such as, for example, woven flat nylon although it could be made of other materials and in other configurations. The laminates 14, 15 and 20 may be made of various materials, however preferably those laminates are made of leather. A name tag for the animal may be embossed or otherwise printed onto the outside of laminate 15

The above described animal collar may readily be used as a training collar as well as a fixed circumference identification collar. Furthermore, by the use of a spring mechanism, the collar, when used as a training collar, will tend not to bind up once the pressure is released on the collar and will return back to its original shape without unduly stressing the animal.

From the foregoing description of the preferred embodiment of the invention, it is apparent that many modifications may be made without departing from the true spirit and scope of the invention.

I claim:

1. An improved animal collar comprising:

at least one elongated laminate; said laminate being curved to generally conform to the shpae of the animal's neck and is adapted to be received around a portion of the animal's neck;

means for providing resilience and stiffness for a portion of said collar; said means for providing resilience and stiffness contacting said at least one laminate; a strap connected to one end of said at least one laminate; eyelet means for slidably receiving a portion of said strap; said eyelet means connected to the other end of said at least one laminate;

attachment means connected to the other end of said strap; means for selectively connecting said attachment means to said at least one laminate whereby said collar may be used either as a choke collar or as a fixed circumference collar; said means for providing resilience and stiffness is an elongated leaf spring; said at least one laminate includes a pair of laminates attached to one another; said leaf spring located between said laminates; said attachment means is a first ring; said eyelet means is a second ring; said laminates are one continuous piece of material bent back on itself forming said pair of laminates; a third laminate being formed as a part of said continuous piece of material, said third laminate being connected to another one of the other laminates forming an open loop, said second ring adapted to be received in said open loop forming a fixed circumference collar.

2. A collar as set forth in claim 1 wherein said strap is adjustable in length to fit various sizes of animals.

* * * * *